June 17, 1924.

M. E. RUTHERFORD

RADIATOR PROTECTOR

Filed Feb. 27, 1923

1,498,482

INVENTOR.
Marvin E. Rutherford,
BY
Geo. P. Kimmel. ATTORNEY.

Patented June 17, 1924.

1,498,482

UNITED STATES PATENT OFFICE.

MARVIN E. RUTHERFORD, OF ABILENE, TEXAS, ASSIGNOR TO ABILENE MANUFACTURING COMPANY, OF ABILENE, TEXAS, A CORPORATION.

RADIATOR PROTECTOR.

Application filed February 27, 1923. Serial No. 621,616.

*To all whom it may concern:*

Be it known that I, MARVIN E. RUTHERFORD, a citizen of the United States, residing at Abilene, in the county of Taylor and State of Texas, have invented certain new and useful Improvements in Radiator Protectors, of which the following is a specification.

This invention has reference to radiator protectors and is designed to shield an automobile radiator from contact with structures liable to do it injury.

It is customary to provide the radiators of automobiles with fenders which will save the radiators from harm due to collision with other structures, such as would be caused by running into another automobile or the like.

The protecting instrumentality may be made heavy so as to prevent harm, in the event of a collision, with the relatively fragile structure of the radiator and so prevent injury or other harm occurring to the radiator itself.

With the present invention, a sturdy shield is provided over the front face of the radiator and this shield may be made of relatively heavy bars or rods bolted to the front of the radiator and also braced to the front wheel fenders of the automobile, such structure requiring the use of but a minimum number of bolts in conjunction with the front fenders to rigidly brace this part of the automobile liable to shocks and jars due to collisions, which collisions become more or less absorbed by the yielding nature of the front fenders so that the elasticity of the structures will prevent any material harm to either the radiator or the parts immediately connected therewith and such shocks and jars will have no disastrous effects upon the rest of the automobile.

The invention comprises a grid or shield supported from the frame of the radiator and composed of relatively heavy bars and rods which are also connected by bolts permitting the dismantling of the grid or shield and provided with brace members extending across the radiator out of contact therewith and supported by other braces reaching to the side fenders at the front of the automobile, to which fenders the parts are bolted or riveted, so that the structure becomes a united structure capable of withstanding heavy blows resisted by the truss formation of the grid or shield, thus avoiding the reception of so heavy blows as to produce leakage in the underlying structure.

The grid or truss structure forming the protection for the head end of the automobile will withstand the shock of collision equal to specially constructed fenders, which special fenders need therefore not be employed. Because of its construction the structure embodying this invention is better able to withstand the shocks and jars of collisions than the special fenders so often employed.

The invention will be best understood from a consideration of the following detailed description taken in connection with the accompanying drawings, forming part of this specification, with the understanding that the invention is not confined to any strict conformity to the showing of the drawings, but may be changed and modified so long as such changes and modifications mark no material departure from the salient features of the invention as expressed in the appended claims.

In the drawings:—

Figure 1:
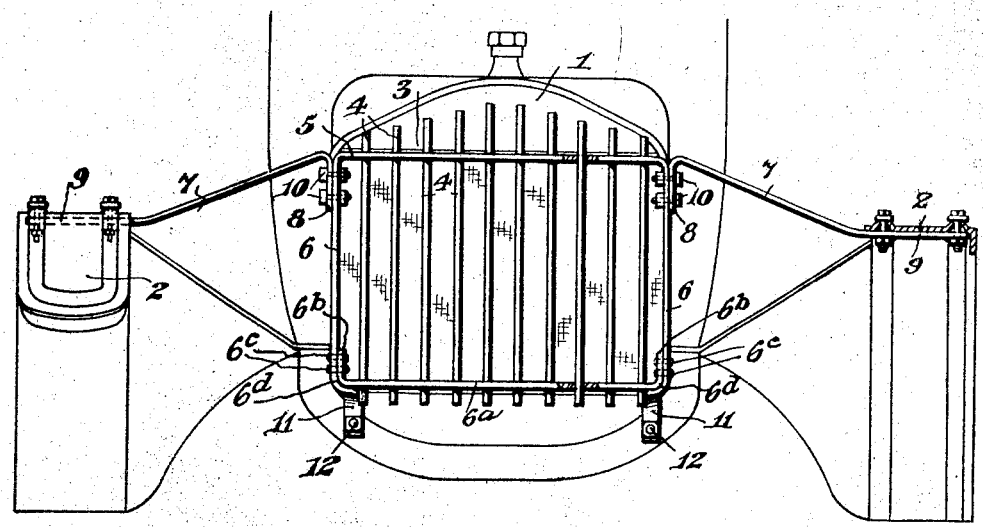
Figure 1 is a front elevation of an automobile with a front grid-like fender connected to the side fenders of the automobile and held thereto by a minimum number of bolts.
Figure 2:
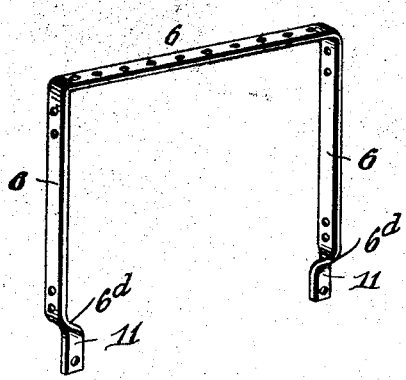
Fig. 2 is a perspective view of a strap frame forming part of the fender and provided with strap connections to the fenders or mud guards at the sides of the automobile.
Figure 4:
Fig. 4 is a view of one of the bars forming part of the upright members of the fender.
Figure 5:
Fig. 5 is a perspective view of one of the side braces extending between the front guard of the radiator and the side mud guards of the upper end of the automobile.
Figure 3:
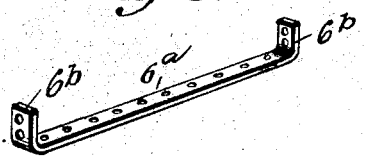
Fig. 3 is a strap element associated with the strap structure of Fig. 2.

Referring to the drawings, there is shown the engine end of an automobile with its protecting hood 1 and front mud guards 2.

The hood 1 is protected by means of a grid 3 formed of closely associated rods 4 of suitable length and height to form a rigid or sturdy grid which will withstand the shocks and jars to which the front of the automobile is liable when colliding with another automobile.

Such a collision is liable to injure the radiator, which is merely indicated without its detailed structure being shown in the drawing.

Such radiator is customarily made of light stock and while it will withstand considerable rough usage, is not built for the purpose of resisting collisions and the like.

For this reason, the front of the radiator is protected by a heavy grid of bar 4 enclosed in an inverted U-shaped frame 5, which frame comprises a top cross and the depending side members 6, which depending members are connected near their lower ends by the cross member $6^a$. This member $6^a$ has its ends upturned as at $6^b$ to abut the inner sides of the member 6, and are secured to 6 by bolts or rivets $6^c$.

The free ends of the side members 6 are inset as at $6^d$ to form shoulders upon which the ends $6^a$ rest, and are then given a torsional twist to bring the width of the free end in a position at right angles to the width of the rest of the members, to provide attaching portions 11 each of which is adapted to be positioned against the front cross member of the chassis frame of the machine, and secured thereto by the bolts 12.

The frame 5, together with the rods 4 may be formed of bar steel properly finished to produce a pleasing effect upon the eyes of the observer, thus providing a sturdy structure having a pleasing finish.

At each upper corner of the frame, there is secured an angle brace bar 7 having one end 8 bent at an acute angle with respect to the lower side of the body of the brace and the other end bent at an obtuse angle 9 with respect to the upper side of the body of the brace so as to extend across the mud guard or fender 2 overtopping the front wheel of the automobile.

The brace 7 is connected to the frame 5 by a pair of bolts 10.

The structure of the invention is of a character permitting a very strong support and guard for the radiator of the automobile, with sturdy braces represented by the bars 7 to sustain the radiator, the said bars 7 also connecting to the upper corner portions of the wheel fenders at the front of the automobile to impart to them a very sturdy support.

The structure forming the subject matter of this invention provides a front guard for the radiator in the form of a grid capable of withstanding heavy shocks and jars to which the radiator is liable to be subjected in meeting another automobile head on and these shocks are resisted by the side brace bars 7 connected to the radiator guard and to the mud guard at the front of the automobile which are reinforced by the bolts 10 and the connections between the braces 7 and the mud guard 2.

What is claimed is:—

1. An automobile radiator guard comprising, a frame formed of an inverted U-shaped element and a transverse member, said transverse member having its ends upturned, each of the side members of said element being inset near the lower portion thereof to provide an inturned shoulder for the support of said transverse member, securing means between said upturned ends and said side members, means formed beneath said shoulders for securing said frame to the front cross member of the automobile chassis, spaced bars within said frame, and an angle brace bar for connecting a side member of the frame with an automobile mud guard.

2. An automobile radiator guard comprising, a frame formed of an inverted U-shaped element and a transverse member, said transverse member having its ends upturned, each of the side members of said element being inset near the lower portion thereof to provide an inturned shoulder for the support of said transverse member, securing means between said upturned ends and said side members, the free ends of said side members beneath said shoulders being given a torsional twist to provide means for securing the frame to the front cross member of the automobile chassis, spaced bars within said frame, and an angle bar for connecting a side member of the frame with an automobile mud guard.

3. An automobile radiator guard comprising, a frame formed of an inverted U-shaped element and a transverse member, said transverse member having its ends upturned, each of the side members of said element being inset near the lower portion thereof to provide an inturned shoulder for the support of said transverse member, securing means between said upturned ends and said side members, the free ends of said side members beneath said shoulders being given a torsional twist to provide means for securing the frame to the front cross member of the automobile chassis, spaced bars within said frame, and an angle bar for connecting a side member of the frame with an automobile mud guard, said brace bar having one acutely angled end for connection with the guard, and another obtusely angled end for connection with the under side of a fender.

In testimony whereof, I affix my signature hereto.

MARVIN E. RUTHERFORD.